United States Patent
Bauer et al.

(10) Patent No.: US 6,310,946 B1
(45) Date of Patent: Oct. 30, 2001

(54) METHOD FOR INTERRUPTING A TELEPHONE CALL AFTER RECEIVING A BUSY SIGNAL

(75) Inventors: Thomas Michael Bauer, Belle Mead; Elroy P. Cartwright, Annandale; Walter C. Taylor, New Brunswick, all of NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 08/842,131

(22) Filed: Apr. 23, 1997

(51) Int. Cl.[7] .............................. H04M 3/42; H04M 3/22
(52) U.S. Cl. .............................. 379/208; 379/35; 379/48; 379/204; 379/218
(58) Field of Search ...................................... 379/208, 215, 379/201, 93, 35, 218, 209, 34, 48, 204, 202, 203, 205, 206

(56) References Cited

U.S. PATENT DOCUMENTS

| | | | |
|---|---|---|---|
| 3,609,245 | 9/1971 | Richter et al. ............. | 179/18 |
| 3,865,985 * | 2/1975 | Stankus ..................... | 379/208 |
| 3,917,910 * | 11/1975 | Nielson ..................... | 379/208 |
| 3,934,095 * | 1/1976 | Matthews et al. ........... | 379/208 |
| 3,944,750 * | 3/1976 | Sobanski .................... | 379/208 |
| 4,096,358 * | 6/1978 | Bidlack et al. .............. | 379/208 |
| 4,899,358 | 2/1990 | Blakley ...................... | 379/67 |
| 4,899,374 * | 2/1990 | Van Landeghem .......... | 379/209 |
| 4,922,490 * | 5/1990 | Blakley ...................... | 379/215 |
| 4,942,601 * | 7/1990 | Park .......................... | 379/208 |
| 4,947,421 | 8/1990 | Toy et al. ................... | 379/67 |
| 4,995,074 * | 2/1991 | Goldman et al. ............ | 379/215 |
| 5,007,076 | 4/1991 | Blakley ...................... | 379/67 |
| 5,228,073 * | 7/1993 | Smith ........................ | 379/218 |
| 5,263,084 * | 11/1993 | Chaput et al. .............. | 379/215 |
| 5,309,512 * | 5/1994 | Blackmon et al. .......... | 379/215 |
| 5,329,578 * | 7/1994 | Brennan et al. ............ | 379/201 |
| 5,351,287 * | 9/1994 | Bhattacharyya et al. .... | 379/35 |
| 5,463,617 * | 10/1995 | Grube et al. ............... | 379/208 |
| 5,471,519 * | 11/1995 | Howe et al. ................ | 379/35 |
| 5,535,261 * | 7/1996 | Brown et al. ............... | 379/35 |
| 5,572,204 * | 11/1996 | Timm et al. ................ | 379/35 |
| 5,619,561 * | 4/1997 | Reese ........................ | 379/202 |
| 5,625,680 * | 4/1997 | Foladare et al. ............ | 379/201 |
| 5,634,197 | 5/1997 | Paavonen ................... | 455/58.1 |
| 5,636,269 * | 6/1997 | Eisdorfer ................... | 379/215 |
| 5,651,060 * | 7/1997 | Cohn et al. ................. | 379/215 |
| 5,666,364 * | 9/1997 | Pierce et al. ............... | 379/208 |
| 5,668,853 * | 9/1997 | Florence et al. ............ | 379/215 |
| 5,680,447 * | 10/1997 | Diamond et al. ........... | 379/215 |
| 5,764,728 * | 6/1998 | Ala et al. ................... | 379/35 |
| 5,812,656 * | 9/1998 | Garland et al. ............. | 379/208 |
| 5,999,613 * | 12/1999 | Nabkel et al. .............. | 379/215 |

* cited by examiner

Primary Examiner—Harry S. Hong
(74) Attorney, Agent, or Firm—Robert B. Levy

(57) ABSTRACT

A telephone subscriber placing a telephone call through a telecommunications network (10) to a telephone line carrying an existing call may interrupt that call by entering an interrupt code to the network. Upon receipt of the code, the network verifies whether the interrupt code is valid by consulting a data base (21) that cross-references interrupt codes to corresponding lines. If the code is valid for the line carrying the existing call, the network then interrupts the existing call.

16 Claims, 1 Drawing Sheet

METHOD FOR INTERRUPTING A TELEPHONE CALL AFTER RECEIVING A BUSY SIGNAL

TECHNICAL FIELD

This invention relates to a technique for enabling a telephone subscriber calling the subscriber's own line to interrupt a telephone call on that line after receiving a busy signal.

BACKGROUND ART

Residential telephone subscribers often find it necessary to call their own line to communicate with a family member or a baby sitter. Often, the reason for making the call may be minor. For example, a subscriber away from home may wish to remind a family member at home, such as a child, to perform some task, such as homework. Some times, the reason for calling home may be more important. For example, a subscriber who is traveling may want to call home to alert a family member of a sudden change in plans, such as a delayed arrival because of bad weather.

Not surprisingly, a subscriber seeking to call his/her own home number may experience a busy signal as a consequence of a family member using the phone. If the subscriber enjoys call waiting, the family member using the phone hears a pulsed tone indicating an incoming call. In response, the family member on the phone can receive the incoming call by executing a "flash" on-hook operation. Reception of the "waiting" call is dependent on willingness of the party on the phone to execute the flash on-hook operation. In some instances, the party on the phone may choose to ignore the pulsed tone signaling a waiting call. Depending on the nature of the call, the party on the phone may even choose to disable the call waiting option, particularly if the party is using the phone to establish a data connection to an On-line or Internet Service Provider.

In addition to call waiting, a telephone subscriber may also subscribe to a network-based messaging service that records a message when the subscriber's own line is busy or does not answer. Thus, a subscriber trying to reach his/her own line can leave a message when the line is busy. However, a family member may not necessarily access the message on a timely basis, if at all. The subscriber has no way of knowing whether the message was indeed received and acknowledged.

Most providers of local telephone service allow their operators to interrupt an existing call to a subscriber's premises on an emergency basis. While the subscriber seeking to call his/her home may believe that the call is important, in actuality, the reason for interrupting the call is not likely to be an emergency to justify an operator's intervention. Consequently, without an actual emergency, a subscriber may be unable to reach home because the line is busy.

Thus, there is a need for a technique to allow a subscriber to interrupt a call on the subscriber's line after receiving a busy signal.

BRIEF SUMMARY OF THE INVENTION

Briefly, a technique is provided for allowing a subscriber placing a call through a telecommunications network to the subscriber's own telephone line to interrupt a call on that line. In accordance with the invention, a subscriber placing a call to the subscriber's own telephone line is alerted by the network whether the line is busy with another call. If the line is busy, the subscriber may enter an interrupt code that authorizes interruption of a call on the subscriber's own line. The interrupt code entered by the subscriber is received in the network which then verifies the code to determine whether the code entered corresponds to that associated with the subscriber's line. If so, the network allows the subscriber to interrupt the call on the subscriber's line. The interruption may be accomplished in several ways. For example, after verifying that the subscriber's interrupt code corresponds the code assigned to the subscriber's line, the network may interrupt the call by placing a particular signal or an announcement on the line indicating to the party on the subscriber's line that an incoming call is waiting which may be received by executing a flash on-hook operation. Alternatively, the network may interrupt the call on the subscriber's line by bridging the subscriber's incoming call immediately, or after a brief announcement indicating that the call will be bridged.

DETAILED DESCRIPTION

Figure 1:
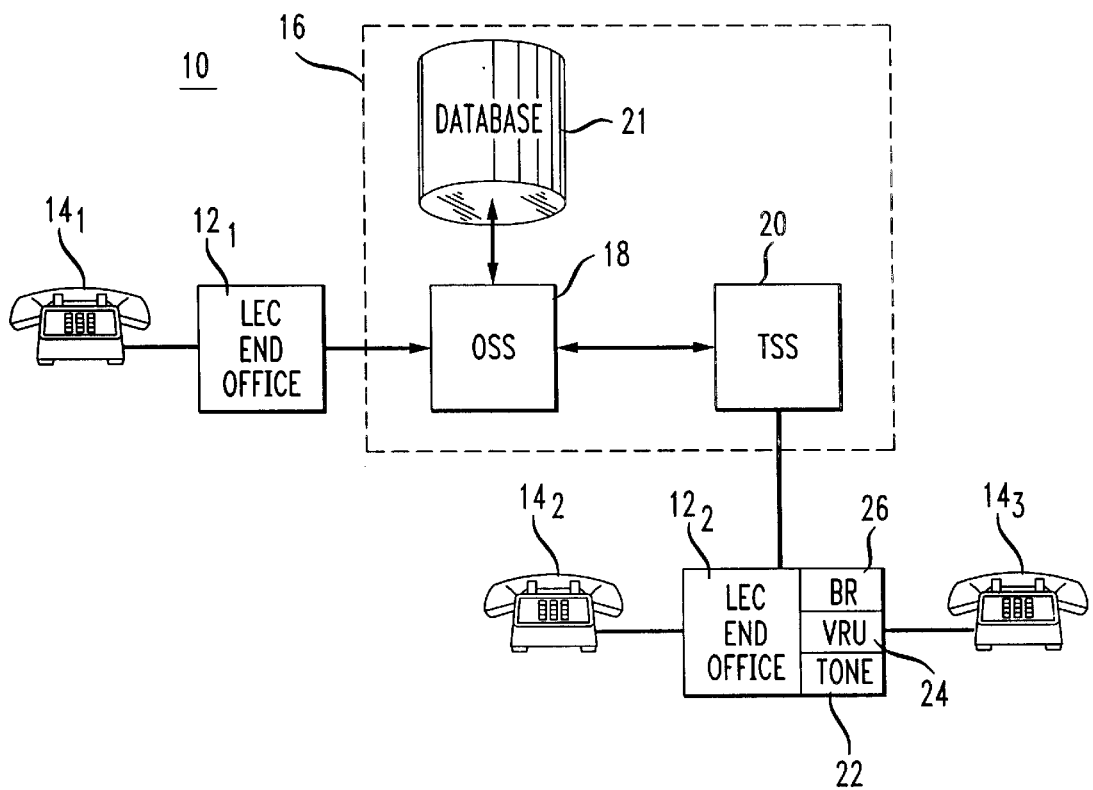
FIG. 1 depicts a block schematic diagram of a telecommunications network for practicing the call interruption method of the invention.

FIG. 1 illustrates a telecommunications network 10 that includes a first local or end office telecommunications switching system $12_1$ maintained by a first Local Exchange Carrier (LEC) for providing local service (i.e., dial tone) to at least one telephone set $14_1$. In practice, the end office telecommunications switching system $12_1$ may comprise a central office switch, such as the 5ESS switch formerly manufactured by AT&T. The end office switching system $12_1$ is connected to another end office switching system located in a different Local Access Transport Area (LATA), such as switching system $12_2$, by at least one Inter-exchange Carrier (IXC) network 16, such as the IXC network maintained by AT&T.

In the illustrated embodiment, the IXC network 16 includes an Originating Toll Switching System (OSS) 18 at which calls enter the network from an end office switching system, such as the end office switching system $12_1$. The OSS 18 typically comprises a model 4ESS switch formerly manufactured by AT&T. The OSS 18 is connected to a Terminating Toll Switching System (TSS) 20 at which a call terminates the IXC network 16 by passing to a LEC terminating end office switch, such as end office switching system $12_2$. Like the TSS 20, the OSS 18 typically comprises a 4ESS switch. While the IXC network is depicted as comprising a single TSS 20 and OSS 18, in practice, the network may include a plurality of OSS's and TSS's connected by one or more via toll switching systems (not shown).

Like the end office switching system $12_1$, the end office switching system $12_2$ provides local service (i.e., dial tone) to telephone sets $14_2$ and $14_3$. Thus, a calling party may place a local call via the telephone set $14_2$ through the end office switching system to a called party via the telephone set $14_3$ through the end office switching system $12_2$. While the telephone sets $14_2$ and $14_3$ are connected to each other, another party trying to place a call to either of these telephone sets will encounter a busy signal. Typically, the busy signal is generated by the end office switch serving the calling party. Thus, a calling party placing a telephone call via telephone set $14_1$ to either of the telephone sets $14_2$ or $14_3$ will receive a busy signal from the end office switching system $12_1$.

Presently, most local service providers afford their subscribers the ability to receive a "waiting" call while on an existing call via a service known as call waiting. A subscriber to this service receives a pulsed tone during a call advising of the waiting call. To answer the waiting call, the party executes a flash on-hook operation. The call waiting service, by itself, provides no opportunity to pre-screen a call so that a party to a telephone conversation might interrupt an important call to take a waiting call which may be far less important, or even undesirable.

To overcome the aforementioned disadvantage of call waiting, some providers of local service now offer the combination of call waiting and caller identification which provides the identity (telephone number) of the waiting call. In this way, a party on a telephone conversation can decide whether to interrupt the existing call to accept the waiting call based on the number from which the waiting call originated. Unfortunately, caller identification only provides the originating number, not the identity of the caller. Consider the case when a family member uses a telephone set (e.g., telephone set $14_1$) which may be a pay phone, to call another family member, say at telephone set $14_2$. Assuming that the subscriber of the telephone set $14_2$ has subscribed to call waiting and caller identification service, the family member using that set would have no reason to associate another family member with the number of the pay telephone set $14_1$ if that number appeared as a waiting call.

In accordance with the. invention, a method is provided for allowing a telephone subscriber to interrupt a telephone call on the subscriber's own line after receiving a busy signal. To describe the method of the invention, assume that a subscriber responsible for the line associated with the telephone set $14_2$ wishes to call that line from the telephone set $14_1$. Further assume that when the subscriber wants to call the subscriber's own telephone line, the line is in use with another call (say, to telephone set $14_3$). In other words, the subscriber attempting to call his/her line will find that line busy.

To allow the subscriber to interrupt a call on his/her own line in accordance with the invention, the subscriber receives an interrupt code from a service provider (for example, the IXC carrier responsible for the IXC network 16). When the subscriber calls his/her telephone line (i.e., the line associated with the telephone set $14_2$), the subscriber receives a busy signal if the phone is in use. After receiving the busy signal, the subscriber can interrupt the call on the telephone set $14_2$ by entering the subscriber's interrupt code. The code itself may contain a header, say the characters *7* or some other character/digit or group of characters and/or digits, to signal the provider of the interrupt service of the subscriber's desire to interrupt a call on the subscriber's line. Alternatively, the subscriber may enter an interrupt command, comprised of a character/digit or group of characters and/or digits, followed by the interrupt code comprised of a group of characters and/or digits. As will be discussed below, the non-command portion of the interrupt code is personal to the subscriber and thus different subscribers will have different non-command interrupt code portions. The command portion of the interrupt code that alerts the service provider of the desire to interrupt the code will typically be the same.

As indicated previously, the present invention contemplates that the IXC carrier maintaining the network 16 provides the interrupt service that allows a subscriber to interrupt a call on the subscriber's own line. Upon receipt of the interrupt code entered by the subscriber via the telephone set $14_1$, the end office switching system $12_2$ passes the interrupt code to the OSS 18 within the IXC network 16. (Under such circumstances, the end-office switching system $12_1$ treats the interrupt code as part of an enhanced call and passes the code to the IXC network 16.) The OSS 18 (or another toll switching system within the IXC network 16, if desired) verifies the interrupt code entered by the subscriber by consulting a data base 21 to determine if the code is valid. In other words, the data base 21 is consulted to determine whether the entered code corresponds to the line number associated with the subscriber's telephone set $14_2$ for which call interruption is desired. If the code is valid, the OSS 18 signals the TSS 20, which in turn, signals the end office switching system $12_2$ to interrupt the call. Such signaling may be by way of an in-band signal, or by an out-of band signal transmitted by a separate signaling network (not shown) such as AT&T's Common Channel Inter-Office Signaling System 7, as is well known in the telephony art.

Upon receipt of the interrupt signal, the end office switching system interrupts the call on the telephone set $14_2$. There are several possible mechanisms by which the end office switching system $12_2$ could interrupt the call. For example, the end office switch $12_2$ could interrupt the call on the telephone $14_2$ by sending a tone, via a tone generator 22 within the switch to alert the party on the telephone set that the subscriber of that telephone set is seeking to interrupt the call. In response, the party on the telephone set $14_2$ would execute a flash on-hook operation, in much the way a caller retrieves a "waiting" call with call waiting service. As an alternative to the tone, the end office switching system $12_2$ could play a voice message, by way of a Voice Response Unit (VRU) 24, alerting the party on the telephone set $14_2$ of the desire by the subscriber of that telephone set to interrupt the call.

As an alternative to simply alerting the party on the telephone set $14_2$ of the subscriber's desire to interrupt the call, the end office switching system $12_2$ could actually bridge the subscriber on the existing call via a bridge 26 within the end office switching system. Such bridging could be accomplished by the end-office switching system $12_2$ without any prior notification following receipt of the interrupt signal from the TSS 20, or following an announcement, via the VRU 24. Another possible mechanism for interrupting the call is to drop the original calling party (e.g., the party calling from the telephone set $14_3$) already in communication with the telephone set $14_2$ and connect the call from the subscriber originating via telephone set $14_1$.

The various mechanisms for call interruption (i.e., signaling, bridging and call substitution) could be initiated by different interrupt codes. Thus, by entering a first code, a subscriber could merely effect signaling of a desire to interrupt the call, whereas entry of another code could effect call bridging. Entry of yet a third code could effect dropping of the original call and substitution of the subscriber's call. The playing of an announcement could also be controlled by entry of an appropriate interrupt code. Moreover, separate codes could be provided separate parties (i.e., different family members of the subscriber) to allow them, to interrupt the call on the subscriber's line with different priorities. For example, a parent could have a code to allow for call bridging whereas a child might have a code that only allows for signaling, either by a tone or announcement of a waiting call. Also, the announcement provided by the VRU 24 could be varied based on the code of a particular party to identify that party.

The call interruption method of the invention has been described in connection the service provisioned by a IXC in connection with an inter-exchange call. The service could also be provisioned by an IXC in connection with a local call in much the same way that other special service calls are provisioned. In other words, a call received by a local end office switching system (say, switching system $12_1$) would be routed to the IXC network 16 upon entry of the interrupt code. Upon entry of the call to the network 16, the OSS 18 would verify to the interrupt code and then signal the local end office switching system whether the code was valid. Assuming the code was valid, the call would pass back to the local end office switching system $12_1$ for interruption in the manner described. Moreover, the call interruption service could also be provisioned by an end office switching system, (say switching systems $12_1$ or $12_2$) by providing them with access to the data base 21 to verify the interrupt code entered by the subscriber.

The call interrupt service has been described in terms of allowing a subscriber to interrupt a call on the subscriber's own line. However, it is entirely possible to allow interruption of a call on any line, provided the party seeking to interrupt the call possessed a valid code for the telephone line carrying the call to be interrupted.

The foregoing describes a technique for interrupting a telephone call on a priority basis.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for allowing a telephone subscriber placing a call to a telephone line through a telecommunications network to interrupt an existing call on the line after receiving a busy signal, comprising the steps of:
    receiving within the telecommunications network an interrupt code entered by the subscriber to interrupt the call on the busy telephone line;
    verifying whether the interrupt code is valid by accessing a data base to determine whether the interrupt code corresponds to the busy telephone line on which the existing call is to be interrupted; and if so then interrupting the existing call.

2. The method according to claim 1 wherein the step of interrupting the call includes the step of placing a tone on the telephone line while the existing call is ongoing.

3. The method according to claim 1 wherein the step of interrupting the call includes the step of playing an announcement on the telephone line while the existing call is ongoing.

4. The method according to claim 3 wherein the step of interrupting the call further includes the step of bridging the call placed by the subscriber with the existing call.

5. The method according to claim 3 wherein the announcement identifies the subscriber interrupting the call.

6. The method according to claim 1 wherein the step of interrupting the existing call includes the steps of terminating the existing call and substituting the call placed by the subscriber.

7. The method according to claim 6 wherein the step of interrupting the call includes the step of playing an announcement prior to terminating the existing call.

8. The method according to claim 1 wherein the call is interrupted in different ways depending on the entered interrupt code.

9. A method for allowing a telephone subscriber placing a call to the subscriber's own telephone line through a telecommunications network to interrupt an existing call on the line after receiving a busy signal, comprising the steps of:
    receiving within the telecommunications network an interrupt code entered by the subscriber to interrupt the call on the subscriber's own busy telephone line;
    verifying whether the interrupt code is valid by accessing a data base to determine whether the interrupt code corresponds to the subscriber's own busy telephone line on which the existing call is to be interrupted; and if so; then
    interrupting the existing call.

10. The method according to claim 9 wherein the step of interrupting the call includes the step of placing a tone on the telephone line while the existing call is ongoing.

11. The method according to claim 9 wherein the step of interrupting the call includes the step of playing an announcement on the telephone line while the existing call is ongoing.

12. The method according to claim 11 wherein the step of interrupting the call further includes the step of bridging the call placed by the subscriber with the existing call.

13. The method according to claim 12 wherein the announcement identifies the subscriber interrupting the call.

14. The method according to claim 9 wherein the step of interrupting the existing call includes the steps of terminating the existing call and substituting the call placed by the subscriber.

15. The method according to claim 14 wherein the step of interrupting the call includes the step of playing an announcement prior to terminating the existing call.

16. The method according to claim 9 wherein the call is interrupted in different ways depending on the entered interrupt code.

* * * * *